(12) United States Patent
Pinard et al.

(10) Patent No.: US 6,819,665 B1
(45) Date of Patent: Nov. 16, 2004

(54) PRIVATE BRANCH EXCHANGE IMPLEMENTED USING H.323 GATEKEEPER

(75) Inventors: Debbie Pinard, Kanata (CA); Harold Sit, Gloucester (CA); Sonya Fullarton, Ottawa (CA); Eliana Peres, Ottawa (CA)

(73) Assignee: Mitel Knowledge Corporation (CA)

( * ) Notice: Subject to any disclaimer, the term of this patent is extended or adjusted under 35 U.S.C. 154(b) by 0 days.

(21) Appl. No.: 09/564,287

(22) Filed: May 4, 2000

(30) Foreign Application Priority Data

May 7, 1999 (GB) ............................................. 9910654

(51) Int. Cl.[7] ............................................. H04L 12/66
(52) U.S. Cl. ...................... 370/352; 370/389; 370/397; 370/401; 379/231; 379/234
(58) Field of Search ................. 370/352–357, 370/389, 392, 395.1, 397, 401; 379/93.01, 93.09, 93.11, 93.14, 93.15, 202, 231, 234, 900, 901, 908

(56) References Cited

U.S. PATENT DOCUMENTS

| | | | |
|---|---|---|---|
| 6,278,478 B1 | * | 8/2001 | Ferriere ..................... 348/14.1 |
| 6,314,284 B1 | * | 11/2001 | Patel et al. .................. 455/417 |
| 6,374,302 B1 | * | 4/2002 | Lalasso et al. .............. 709/238 |
| 6,430,176 B1 | * | 8/2002 | Christie, IV ................ 370/355 |
| 6,430,699 B1 | * | 8/2002 | Carter et al. .................... 714/4 |
| 6,449,260 B1 | * | 9/2002 | Sassin et al. ............... 370/270 |
| 6,490,275 B1 | * | 12/2002 | Sengodan ................... 370/356 |
| 6,507,647 B1 | * | 1/2003 | Mandalia .................... 379/219 |
| 6,553,116 B1 | * | 4/2003 | Vander Meiden ...... 379/355.08 |
| 6,731,609 B1 | * | 5/2004 | Hirni et al. ................. 370/260 |

FOREIGN PATENT DOCUMENTS

| | | |
|---|---|---|
| WO | 9817048 | 4/1998 |
| WO | 9857485 | 12/1998 |

* cited by examiner

*Primary Examiner*—Steven Nguyen
*Assistant Examiner*—Roberta Stevens
(74) *Attorney, Agent, or Firm*—Jones Day

(57) ABSTRACT

A network implemented communication system, comprising a Local Area Network (LAN), a plurality of H.323 endpoints connected to the LAN, each of the endpoints including a communication application for communicating via H.323, at least one H.323 Gatekeeper connected to the LAN for third party control of communications between the H.323 endpoints, and software within each of the H.323 endpoints and the H.323 Gatekeeper for implementing features which do not require direct connection between the H.323 endpoints.

9 Claims, 8 Drawing Sheets

PRIVATE BRANCH EXCHANGE IMPLEMENTED USING H.323 GATEKEEPER

FIELD OF THE INVENTION

The present invention relates in general to network-based voice communications, and more particularly to a voice-LAN PBX (Private Branch Exchange) implemented using H.323 Gatekeepers.

BACKGROUND OF THE INVENTION

H.323 is an emerging standard for multi-media communication. This standard governs communications between terminals and other entities over a packet switched network. A person of ordinary skill in the art and who is familiar with the H.323 standard will understand the elements of establishing third party call control via a Gatekeeper. Briefly, upon powering up, a H.323 endpoint (desktop) implements a discovery process for determining which Gatekeeper to register with. This can be effected in a number of ways, such as by multicasting a message which identifies the endpoint (i.e. the GRQ message) to a predetermined multicast address. The assigned Gatekeeper then responds (i.e. the GCF/GRJ message) with its RAS channel address (i.e. IP address). Before attempting to place a call, the endpoint must register with the Gatekeeper (i.e. the RRQ message) by advising it of its transport address and any aliases (discussed below). Registration is then confirmed by the Gatekeeper (i.e. via the RCF/RRJ message). Actual call signaling takes place over and established channel between two H.323 endpoints using Q.931 messages. For third party (i.e. Gatekeeper) call control, the originating endpoint sends a H.225 Admission Request (ARQ) to the Gatekeeper over the previously established RAS channel. The Gatekeeper responds with an ACF message which specifies the call signaling transport address to use for the call setup. The originating endpoint then transmits a Setup message to the Gatekeeper which, in turn, sends a Setup message to the destination endpoint. The destination endpoint then sends an admission request (ARQ) to the Gatekeeper and receives an acknowledgment (ACF) therefrom. Finally, a Connect message is sent from the destination endpoint to the Gatekeeper which contains the address of the originating endpoint for H.425 control messages to the originating endpoint.

The inventors have recognized the desirability of adapting the H.323 standard to voice communications such as traditionally implemented via a PBX. In the context of this contemplated telephony application, a call setup under the H.323 protocol requires two H.323 compliant endpoints to completely set up the call.

There are some features of PBXs, such as callback, recall, and make call (TAPI), among others, which require the system to make a half call to a device, and only after there has been some user response at the device then initiate a full call between the two endpoints. For example, in order to 'ring' a device in a PBX, the system itself initiates ringing of the device (without any requirement to have actual communication between endpoints). Then, when the device is 'answered' (i.e. the user goes off hook), the PBX establishes a call between the two endpoints. The H.323 standard does not allow for such behavior since the protocol requires two H.323 endpoints in order to initiate and complete a call.

Also, there are group features, such as key line appearances, pickup groups, etc., that are necessary in a PBX, and which are not supported by the H.323 endpoint communication protocol. Group features are normally handled in the PBX call control, and many different device types can be members of groups. Since H.323 requires communication between distinct H.323 entities, it is not possible to establish features wherein multiple H.323 endpoints are arranged in a group. Similarly, it is not possible to select from a group of trunks or a particular trunk to make a call.

SUMMARY OF THE INVENTION

According to the present invention, a system is provided for implementing full PBX functionality in a networked environment, using the H.323 standard. Specifically, an H.323 Gatekeeper is provided into which PBX call control functions are incorporated to enable feature interaction while controlling resource allocation. Also, software elements are provided for accommodating half call, group and trunk selection features within the H.323 environment.

BRIEF DESCRIPTION OF THE DRAWINGS

An embodiment of the invention is described below with reference to the accompanying drawings, in which.

DETAILED DESCRIPTION OF THE PREFERRED EMBODIMENT

Figure 1:
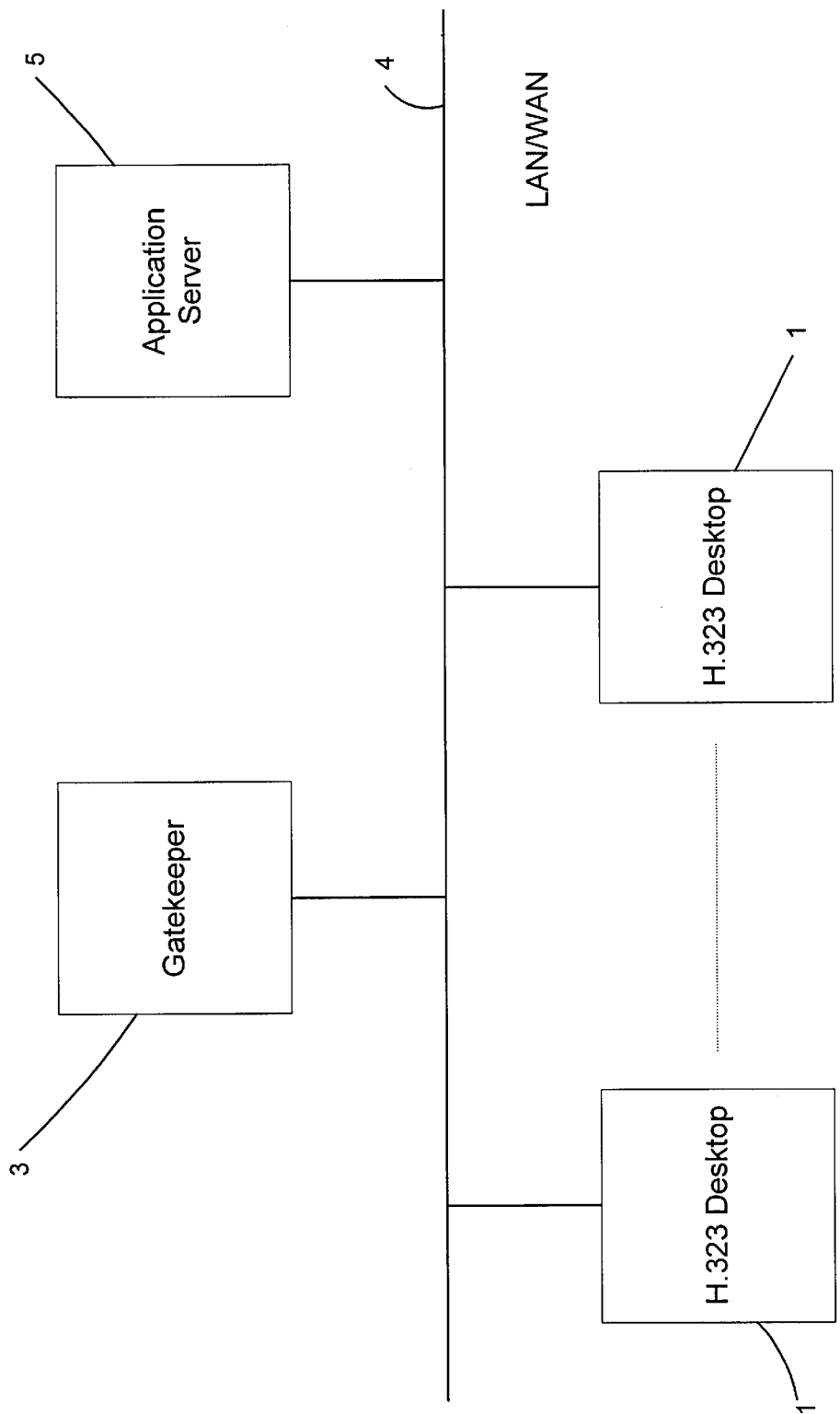
FIG. 1 is a schematic representation of a network-based communication system implemented according to the H.323 standard, including a Gatekeeper, an Application Server and a plurality of H.323 devices.

FIG. 1 shows a typical H.323 system, with H.323 endpoints 1 and a Gatekeeper 3 connected to a LAN/WAN 4, according to a fully-routed H.323 Model. An Application Server 5 is also connected to the LAN/WAN 4, which uses TAPI, TSAPI or JTAPI to control endpoints for telephony applications.

According to one aspect of the present invention, the H.323 system of FIG. 1 is modified to support traditional PBX half call features such as TAPI Make Call, Callback, etc.

Figure 2:
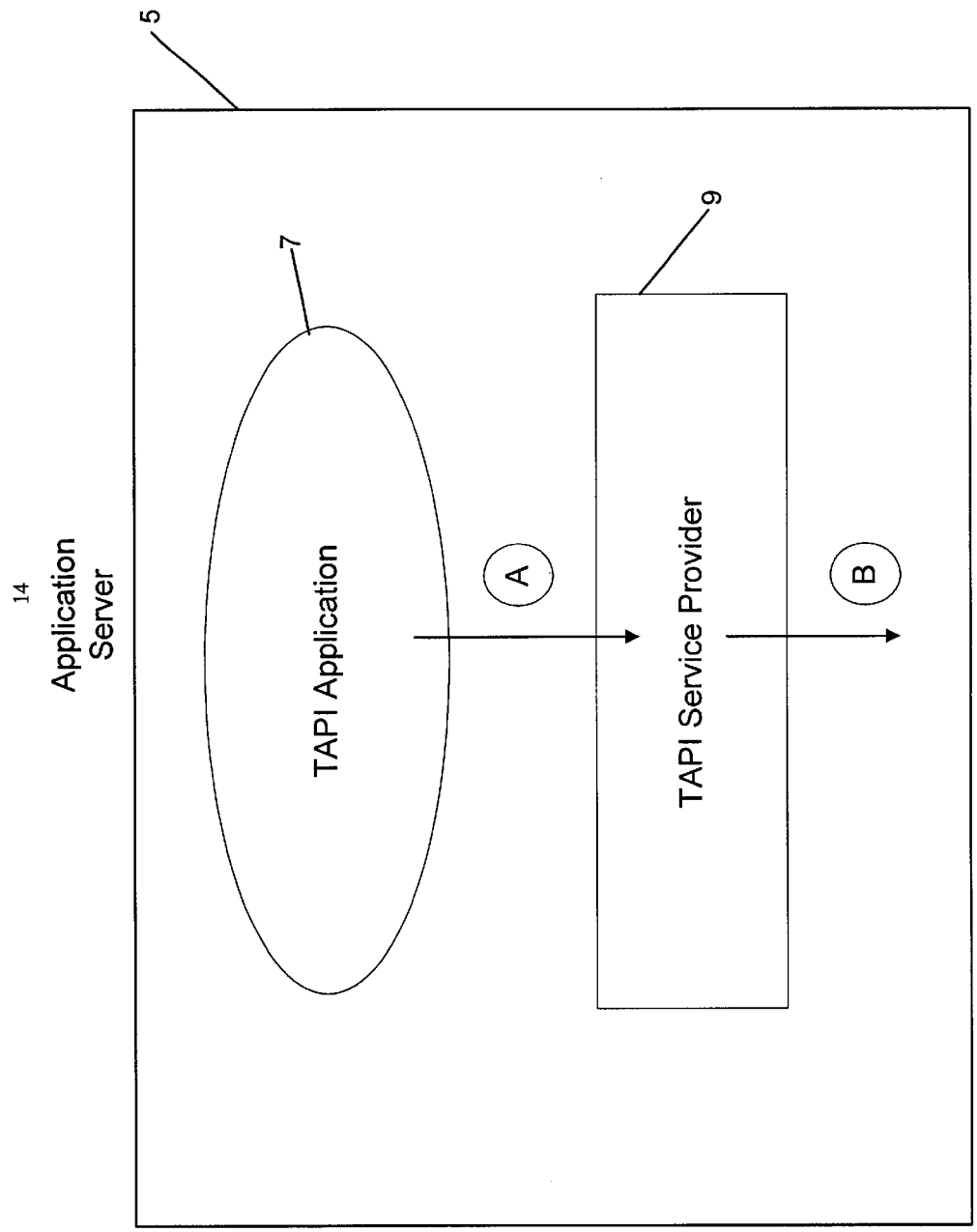
FIG. 2 is a schematic representation of an Application Server forming part of the system of FIG. 1.

FIG. 2 shows the Application Server 5 of FIG. 1 in greater detail, with a TAPI Application running in conjunction with a TAPI Service Provider. Message A represents a request from the TAPI application 7 to the TAPI Service Provider 9 (e.g. "make call"), for initiating a call between endpoints.

Message B represents the message that the TAPI Service Provider sends to one of either a H.323 endpoint 1 (i.e. desktop), or the Gatekeeper 3 to have this occur. Where the TAPI application 7 is a first party application (which can reside inside the desktop), message B causes the desktop 1 to initiate a call. For third party control, the Gatekeeper 3 controls the H.323 endpoints so that a call is placed by one endpoint to another endpoint, as discussed in greater detail below. According to the present invention, it is preferable that all third party applications that require access to endpoints, be controlled by the Gatekeeper 3 for regulating feature interactions and resource usage.

Figure 3:
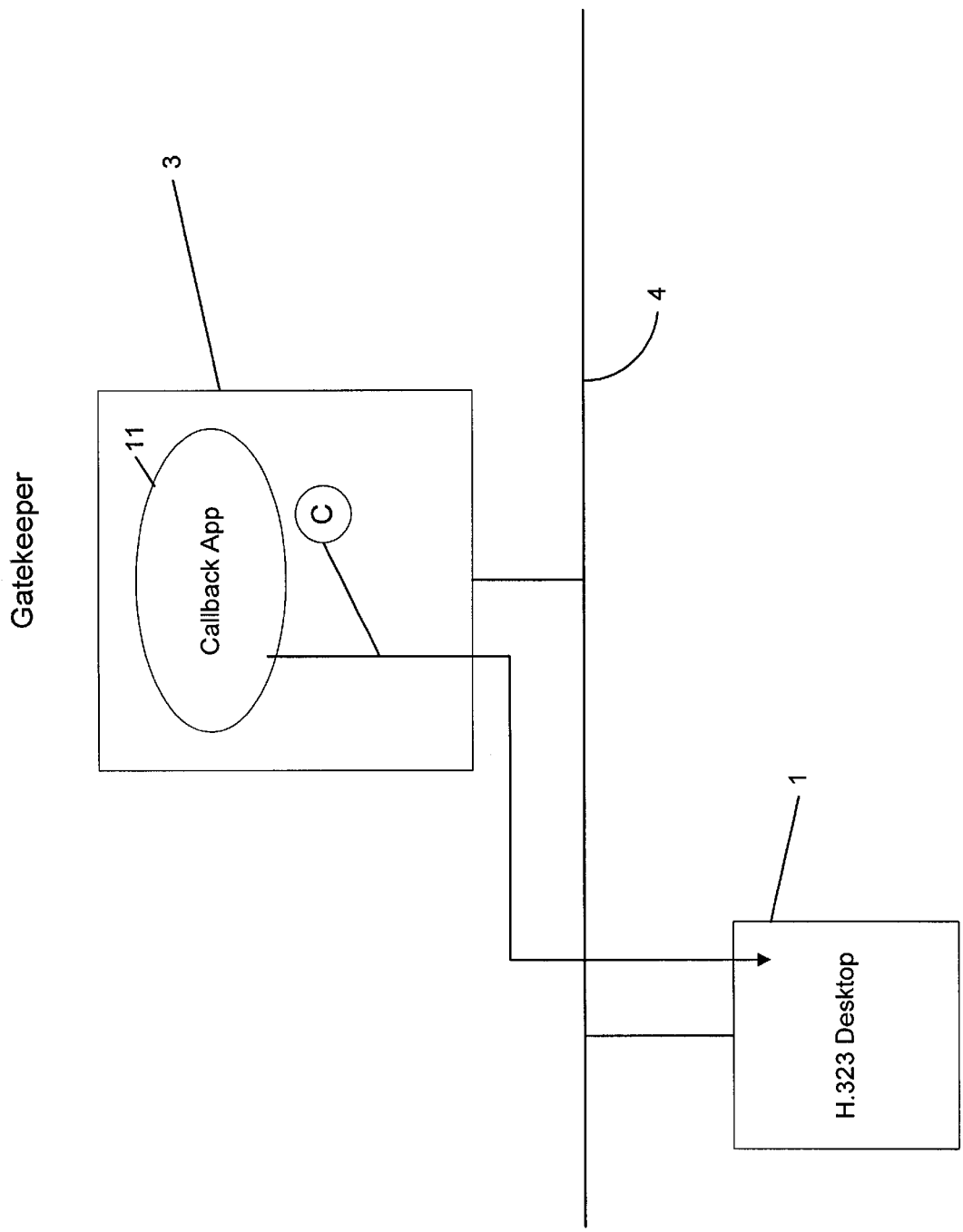
FIG. 3 is a schematic representation of a callback application in the H.323 Gatekeeper of FIG. 1 in communication with an H.323 device.

FIG. 3 shows a similar situation, where a callback application 11, which monitors devices associated with two parties (only one party (desktop 1) being shown in FIG. 3) and which have callbacks set, to be free, and sends a message to indicate the invoking of the callback feature. In a manner similar to the TAPI call make application of FIG. 2, the message follows a similar path so that feature interactions and resource usage are controlled by the Gatekeeper 3.

Figure 4:
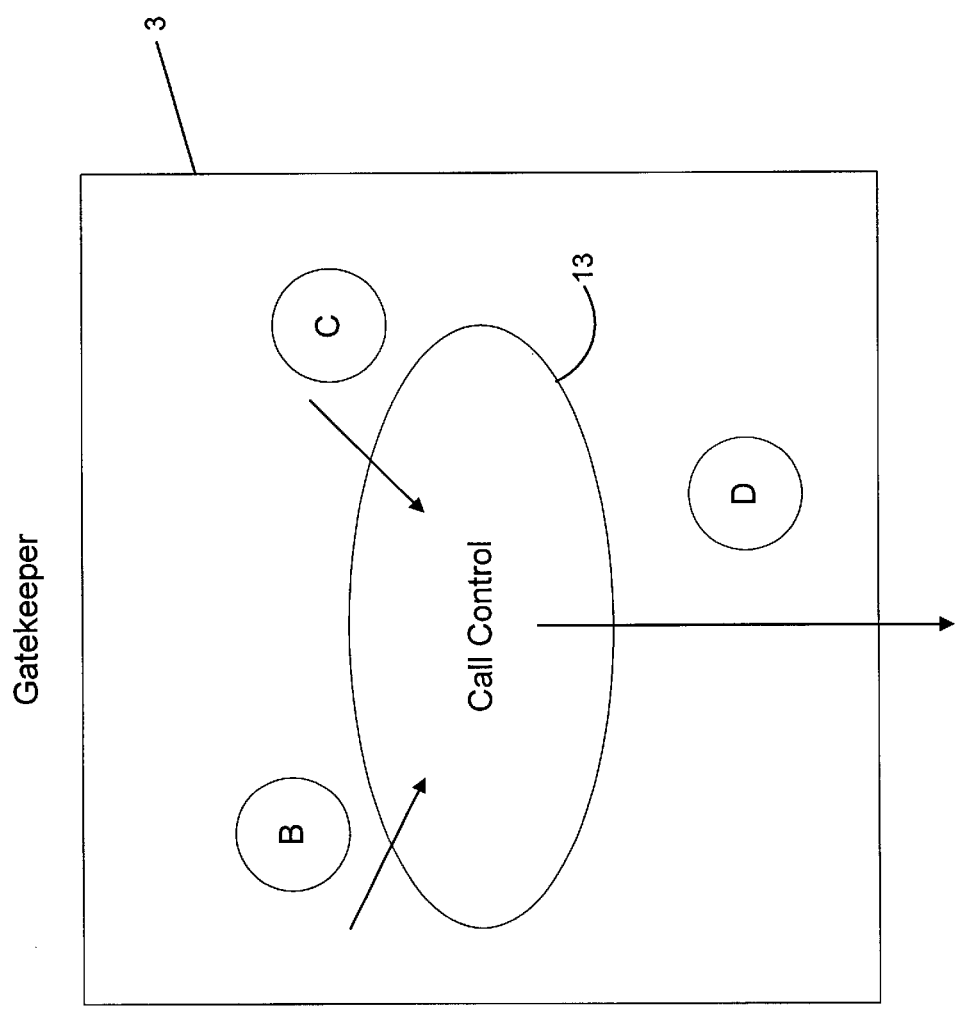
FIG. 4 is a schematic representation of a Call Control application running in the Gatekeeper of FIG. 1.

Inside the Gatekeeper (FIG. 4), call control software 13 receives message B (make call) and message C (call back), performs any required data checking, and communicates with the H.323 endpoint using message D, so that the endpoint device performs the requested function. However, as discussed above, the H.323 device is only capable of communicating via H.323 messaging, and the H.323 protocol does not support messaging to provide half-call functionality. Therefore, according to the present invention, components are provided for transmitting the required message to the H.323 endpoint/desktop in such a way that the H.323 desktops 1 accept the message and initiate the call.

Figure 5:
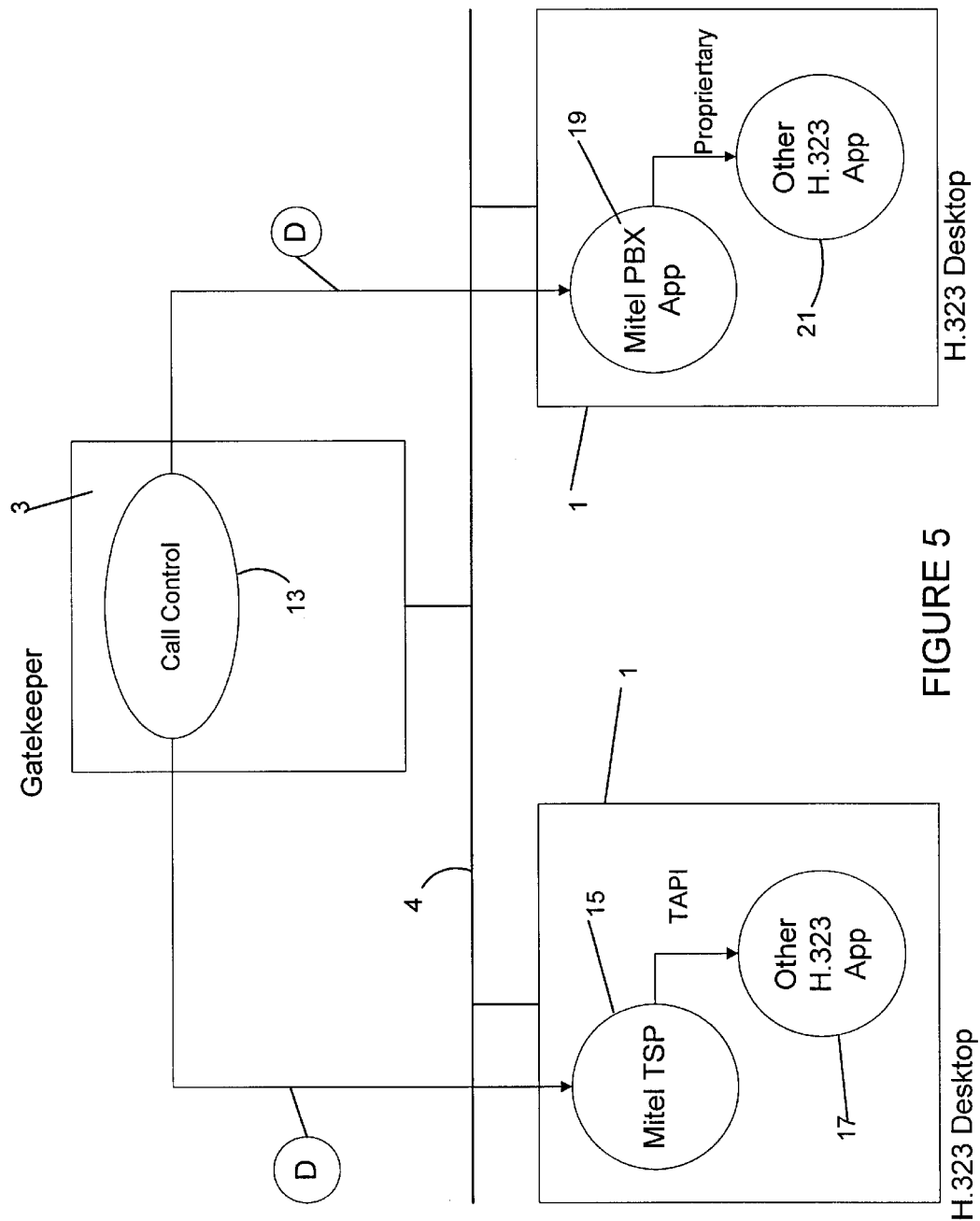
FIG. 5 shows alternative implementations of PBX features using the Gatekeeper and H.323 devices, in accordance with a first aspect of the present invention.

One solution according to this invention is shown in FIG. 5. When the Call Control software 13 in the Gatekeeper 3 receives either of the messages B or C, it uses TAPI to pass the message to a TSP 15 (TAPI Service Provider) that is loaded in the desktop 1 along with a TAPI compliant H.323 Application 17 (hereinafter H.323 App). The TSP 15 in turn uses TAPI to invoke a call on the H.323 App 17 when it receives the message (B or C) from the Gatekeeper call control 13. Thus, the TAPI command D causes the H.323 App 17 to make a H.323 call to another H.323 endpoint (not shown). In this way, the Gatekeeper 3 effectively causes a third party application to implement first party control.

Alternatively, where the H.323 App is not TAPI compliant (e.g. H.323 App 21 in FIG. 5), a specialized application (Mitel PBX App) may be provided for each different H.323 application. This Mitel PBX App, upon receipt of a proprietary message (as opposed to a TAPI command) from the Gatekeeper call control 13, emulates user actuation of "buttons" in the application GUI via Windows® commands e.g. a "Make Call" or "Callback" button) which causes the H.323 App 21 to make the appropriate call. The Mitel PBX App 21 then indicates to the user that the feature (in the case of callback or recall) has been invoked, and asks the user to accept it (e.g. "You have a callback. Do you wish to accept it?"). When the user accepts, the Mitel PBX App 19 causes the H.323 App 21 to make the call using the standard H.323 call sequence.

Figure 6:
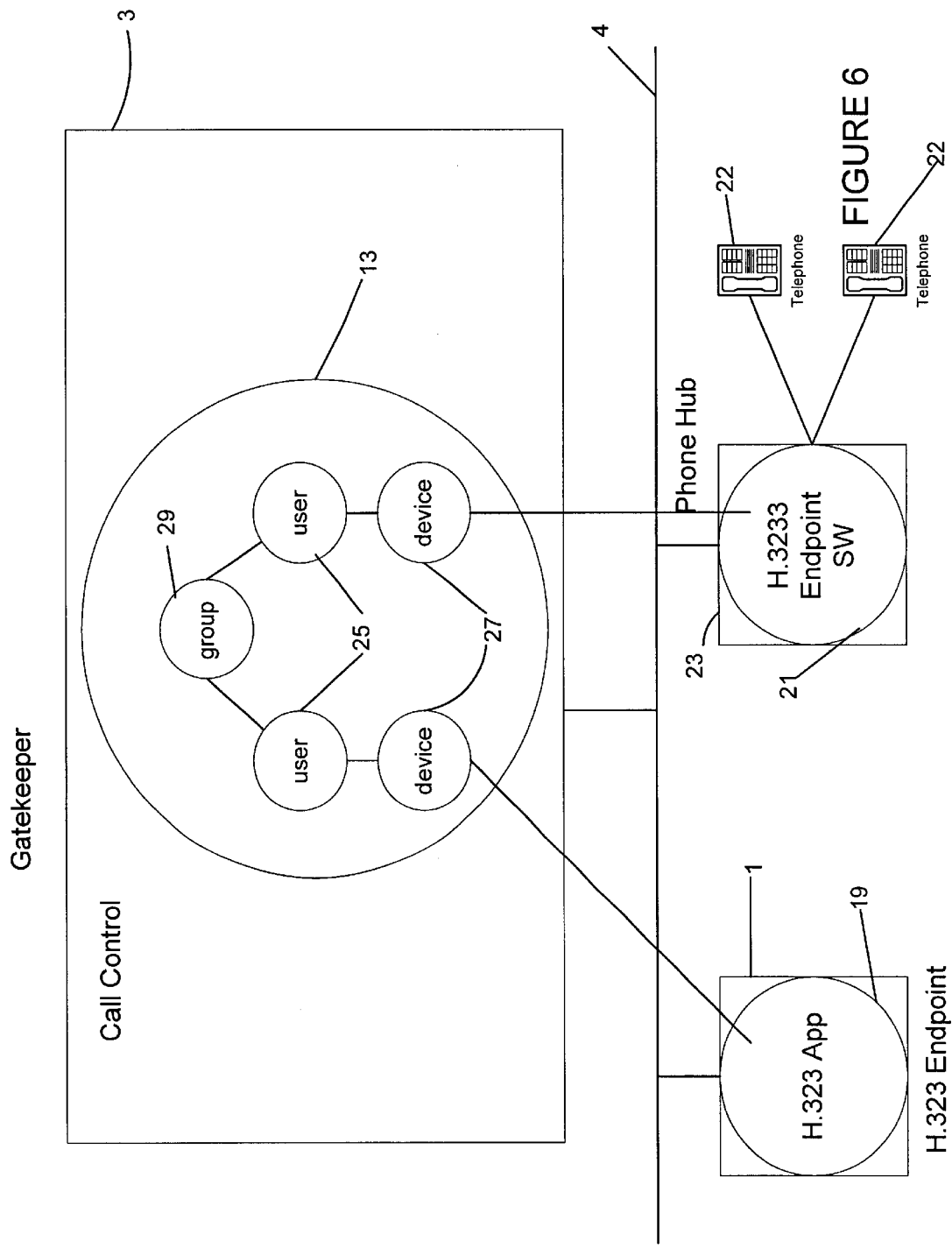
FIG. 6 shows message flow between the Call Control application in the Gatekeeper and H.323 endpoints for implementing PBX group features, according to a further aspect of the present invention.

According to another aspect of the invention, PBX group features such as key line appearances, pickup groups, etc., are implemented using the H.323 feature of 'aliases', which can be pointers to specific endpoints. In the case of a group, an H.323 pointer is provided to an application which, based on predetermined criteria, selects the specific H.323 endpoint to receive a call. As discussed in greater detail below, normal H.323 message flow occurs throughout the system with the exception that, after the admission control message and the request to make a call, the particular group application indicated by the 'alias' received from the desktop application 1, is consulted so that the correct endpoint is selected. If there is more than one endpoint, (e.g. a network broadcast message) then the answer message determines which endpoint will establish the connection and perform H.245 messaging, etc.

Where analog, DNIC and/or ISDN sets 22 are to be provided in the same group as H.323 devices (bearing in mind that H.323 devices can only communicate with other H.323 devices), then the H.323 endpoint software 21 is implemented in a phone hub 23 for performing all H.323 signaling for the phones 22, and to handle the conversion of TDM voice data to packet-based H.323 data, as shown in the embodiment of FIG. 6.

Inside the Gatekeeper 3, the call control application 13 is shown divided into different software components. Each user (or H.323 alias) has software 25 running to represent him/her. When a user registers with the Gatekeeper 3 (i.e. via the exchange of RRQ and RCF/RRJ messages between the user's H.323 endpoint (desktop 1) and the assigned Gatekeeper, according to established H.323 protocol) then the device he/she registers on is 'attached' to the user code 25. This device is handled by specific device software 27. When the phone hub 23 powers up and discovers its Gatekeeper, it automatically registers all of the phone devices 22 with the Gatekeeper 3. When groups are created with different users, then a group application 29 is created for that particular group, and the user software components 25 are connected to it. The device code 27 handles the H.323 specific messages (like registration and admission), whereas the user code 25 and group code 29 handle PBX functionality. The implementation of the group, user and device software discussed above can be in the form of software agents, as set forth in commonly owned U.S. Pat. No. 5,638,494 entitled Adaptive Communication System, or as simple processes running in an operating system.

All messages from an H.323 App 21 are routed to the Gatekeeper 3 via the device agent 27 and user agent 25, which consults (if necessary) with the group agent 29 to determine which other user agents 25 should receive the messages. Thus, in the case where monitoring of groups or lines is required, when a call is made by a first endpoint to an endpoint identified by a group alias, the group agent 29 informs the software 21 or 19 (i.e. software either running on the phone hub, or the desktop), using either a proprietary message or a TAPI message, or a modified H.323 message (like in the callback etc. case). The software receiving the message then causes an appropriate user interface action to occur (such as illuminating a soft key or lamp, displaying text on a screen, etc.).

Figure 7:
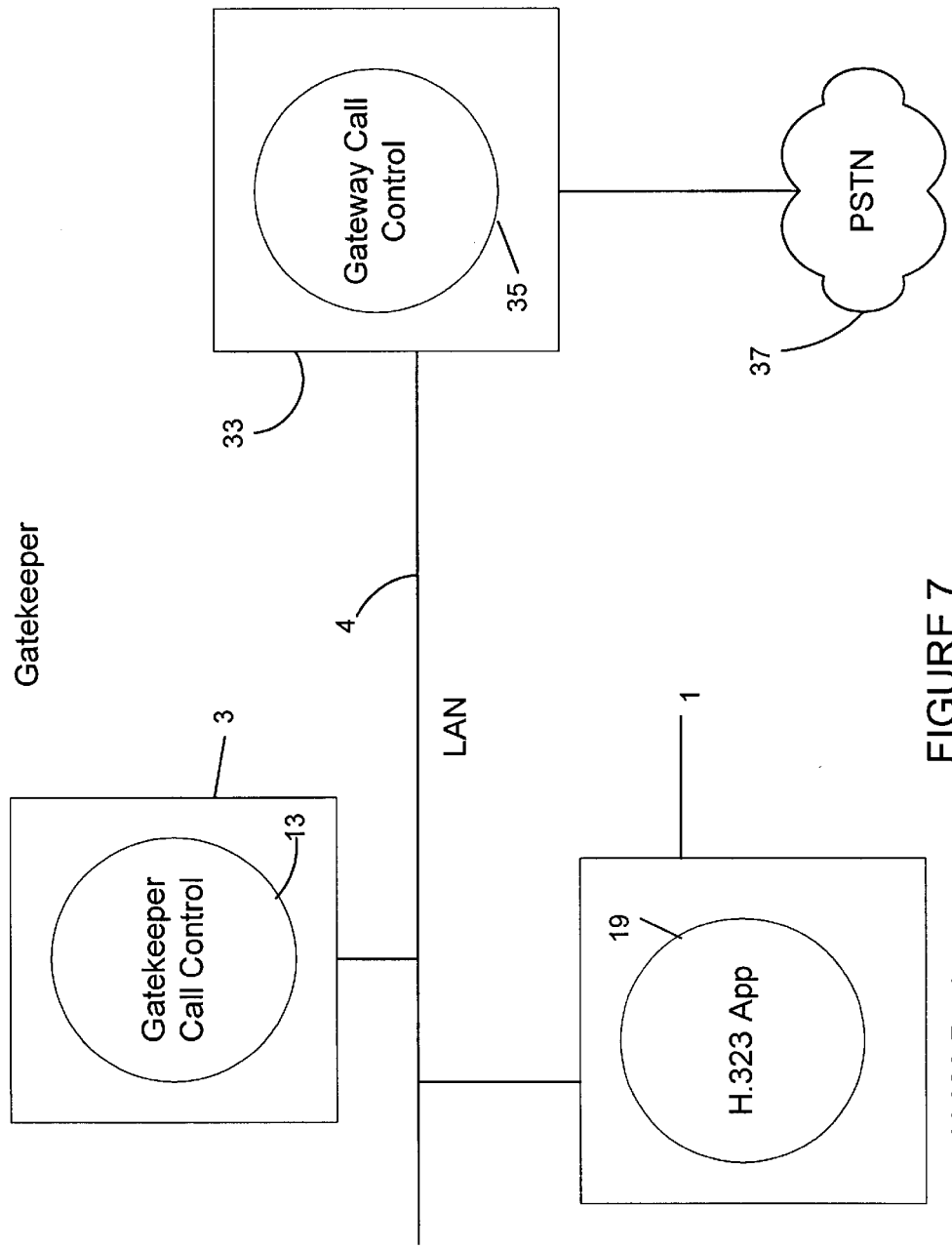
FIG. 7 is a diagrammatic representation of a configuration for implementing PBX trunk selection features initiated by an H.323 device using an H.323 Gatekeeper and Gateway, in accordance with an additional aspect of the present invention.

In a PBX/key system, another set of features allows for the selection of a trunk from a group of trunks to make a call over the Public Switched Telephone Network (PSTN). In order to support this feature in the H.323 environment, the Gatekeeper 3 implements a conversion according to an indicated alias for a group of trunks. With reference to FIG. 7, the Gatekeeper 3 (with call control software 13) is connected to the LAN 4 along with H.323 desktop 1 (and associated H.323 Appl9) and a H.323 Gateway 33 (with associated gateway call control 35) connected to PSTN 37. As will be understood by a person of ordinary skill in the art, a Gateway is an H.323 device for transparently reflecting the characteristics of a LAN endpoint to an SCN (Switched Circuit Network) endpoint, and vice versa. The Gateway 3 is connected to the PSTN 37.

Figure 8:
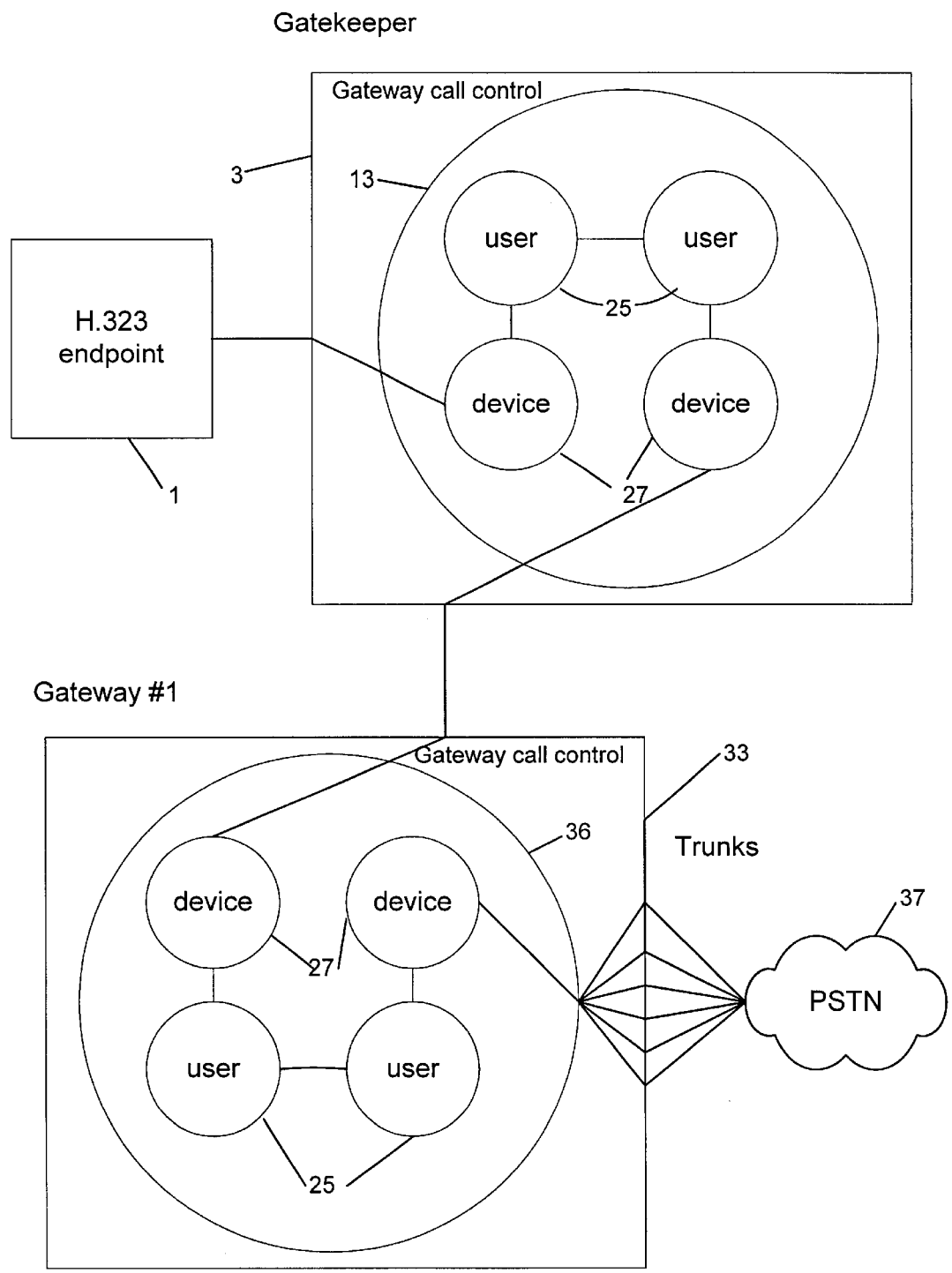
FIG. 8 shows additional functional details of the configuration of FIG. 7.

The message flow for implementing trunk selection is shown in greater detail with reference to FIG. 8. In the event that a user at the desktop 1 wishes to select a particular trunk, the H.323 App 19 in the desktop 1 generates the appropriate user interface (e.g. window) to allow the user to indicate which trunk or set of trunks should be selected. When the H.323 endpoint 1 indicates that it wants to select a particular trunk, the usual Q.931 call setup message is sent from the desktop 1 to the Gatekeeper 3. The setup message contains an alias for a particular trunk to be selected. The user code 25 within call control 13 routes the setup message to the gateway endpoint identified by the alias. The Gateway 33 is also provided with call control software 36, which includes user code 25 and device code 27, which operate as discussed above. The call control software 36 receives the H.323 setup request which contains the actual trunk/trunk group indication and passes it to the appropriate user code 25 handling the indicated trunks. Since the user expects to hear dial tone from the PSTN 37, the gateway code 36 automatically 'answers' the call by signaling back the appropriate H.323 connect message, which thereby establishes a speech path back to the endpoint, whereupon end to end signaling is established between the originating endpoint 1 and the PSTN.

In summary, the incorporation of PBX call control function into the Gatekeeper gives rise to controlled feature interactions and resource allocation according to pre-programmed rules, in an H.323 environment. Therefore, third party applications are provided access to H.323 devices in combination with other devices, without requiring gateway functionality between the devices. Thus, in accordance with the present invention, an 'H.323 PBX' is provided, with all of the traditional PBX functionality, but implemented under control of a Gatekeeper.

Alternatives and variations of the invention are possible within the sphere and scope of the claims appended hereto.

What is claimed is:

1. A network implemented communication system, comprising:

a Local Area Network (LAN);

a plurality of H.323 endpoints connected to said LAN, each of said endpoints including a communication application for communicating via H.323;

at least one H.323 Gatekeeper connected to said LAN for third party control of communications between said H.323 endpoints; and software within each of said H.323 endpoints and said H.323 Gatekeeper for implementing features which do not require direct connection between said H.323 endpoints, wherein said software comprises a call control application in said Gatekeeper including a plurality of user software agents representing said H.323 endpoints, wherein said user software agents generate feature commands for receipt by respective device software agents in said call control application which in response forward said commands via H.323 communications to said H.323 endpoints, and a plurality of H.323 applications in each of said H.323 endpoints for implementing said features in response to receiving said feature commands.

2. The network implemented communication system of claim 1, wherein said software comprises a call control application in said Gatekeeper for generating TAPI commands and a TAPI Service Provider application in at least one of said H.323 endpoints for implementing said features in response to receiving said TAPI commands from said Gatekeeper.

3. The network implemented communication system of claim 1, wherein said software comprises a call control application in said Gatekeeper for generating proprietary commands and a proprietary application in at least one of said H.323 endpoints for implementing said features in response to receiving said proprietary commands from said Gatekeeper.

4. The network implemented communication system of claim 2, wherein said TAPI Service Provider invokes a call to another one of said H.323 endpoints via said communication application.

5. The network implemented communication system of claim 3, wherein said proprietary application invokes a call to another one of said H.323 endpoints via said communication application.

6. The network implemented communication system of claim 5, wherein said call is invoked via software commands which emulate user inputs to said communication application.

7. The network implemented communication system of claim 1, wherein said call control application in said Gatekeeper further comprises a group software agent indicated by an H.323 alias, said group software agent being in communication with said plurality of user software agents representing a group of said H.323 endpoints, said group software agent and said user software agents generating group feature commands for implementing said features in said group of H.323 endpoints.

8. The network implemented communication system of claim 7, wherein at least one of said H.323 applications is implemented in a phone hub to which a plurality of telephony devices are connected, for performing said H.323 communications and converting TDM voice data to packet-based H.323 data.

9. The network implemented communication system of claim 1, wherein at least one of said H.323 endpoints is an H.323 Gateway indicated by an H.323 alias, said Gateway being connected to a plurality of trunks connected to the Public Switched Telephone Network (PSTN), and wherein a predetermined one of said H.323 endpoints desirous of seizing one of said plurality of trunks generates an H.323 setup message containing said alias whereupon said call control software routes said message to said Gateway.

* * * * *